(12) United States Patent
Nielsen, Jr. et al.

(10) Patent No.: US 9,721,696 B2
(45) Date of Patent: Aug. 1, 2017

(54) WIRE FOR DEEP WATER TRANSMISSION

(71) Applicants: William D. Nielsen, Jr., Kingwood, TX (US); Diane M. Nielsen, Kingwood, TX (US); Walter G. Maxwell, Avon Lake, OH (US)

(72) Inventors: William D. Nielsen, Jr., Kingwood, TX (US); Diane M. Nielsen, Kingwood, TX (US); Walter G. Maxwell, Avon Lake, OH (US)

(73) Assignee: MATERION CORPORATION, Mayfield Heights, OH (US)

( * ) Notice: Subject to any disclaimer, the term of this patent is extended or adjusted under 35 U.S.C. 154(b) by 0 days.

(21) Appl. No.: 14/832,507

(22) Filed: Aug. 21, 2015

(65) Prior Publication Data
US 2016/0064116 A1  Mar. 3, 2016

Related U.S. Application Data

(60) Provisional application No. 62/040,272, filed on Aug. 21, 2014.

(51) Int. Cl.
*H02G 7/00* (2006.01)
*H01B 3/00* (2006.01)
*H01B 1/02* (2006.01)
*H01B 7/282* (2006.01)
*H01B 7/04* (2006.01)

(52) U.S. Cl.
CPC ............... *H01B 3/004* (2013.01); *H01B 1/02* (2013.01); *H01B 1/026* (2013.01); *H01B 7/045* (2013.01); *H01B 7/2825* (2013.01)

(58) Field of Classification Search
USPC ......... 174/74 R, 78, 84 R, 88 R, 102 R, 108, 174/109
See application file for complete search history.

(56) References Cited

U.S. PATENT DOCUMENTS

| | | | | |
|---|---|---|---|---|
| 2,027,750 A | * | 1/1936 | Munson | C22C 9/06 148/435 |
| 2,873,307 A | * | 2/1959 | Horn | H01B 7/14 174/102 R |
| 3,634,607 A | * | 1/1972 | Coleman | H01B 7/14 174/108 |
| 3,874,960 A | * | 4/1975 | Matsuzaki | H01R 9/0503 156/49 |

(Continued)

OTHER PUBLICATIONS

International Search Report and Written Opinion dated Nov. 23, 2015 for PCT Application Serial No. PCT/US2015/046346.

*Primary Examiner* — William H Mayo, III
(74) *Attorney, Agent, or Firm* — Richard M. Klein; Fay Sharpe LLP

(57) ABSTRACT

An electrically conductive wire for deep water transmission includes a first wire portion and a second wire portion. The first wire portion makes up one end of the wire, and is formed from a first metal. The second wire portion is formed from a second metal. The first metal has a higher ultimate tensile strength than the second metal. The first wire portion is used to support the weight of the second wire portion, thereby allowing the electrically conductive wire to be used in underwater or subsea power cables which may be freely suspended from their origin for providing electricity to electrical devices located in deep water or ultra-deep water.

19 Claims, 6 Drawing Sheets

(56) References Cited

U.S. PATENT DOCUMENTS

| | | | |
|---|---|---|---|
| 4,224,462 A | 9/1980 | Occhini et al. | |
| 4,579,420 A | 4/1986 | Winter et al. | |
| 4,644,097 A * | 2/1987 | Johnsen | H01B 7/14 |
| | | | 174/102 R |
| 8,668,406 B2 | 3/2014 | Vidal et al. | |
| 8,981,224 B2 * | 3/2015 | Kehl | H01R 4/70 |
| | | | 174/84 R |
| 9,136,040 B2 * | 9/2015 | Zettervall | H02G 1/14 |
| 2001/0016103 A1 * | 8/2001 | Hoch | H01B 7/14 |
| | | | 385/107 |
| 2012/0024565 A1 * | 2/2012 | Orini | H01B 7/14 |
| | | | 174/106 R |
| 2014/0060884 A1 * | 3/2014 | Patel | H01B 7/2825 |
| | | | 174/102 A |
| 2014/0166335 A1 | 6/2014 | Kagoura et al. | |

* cited by examiner

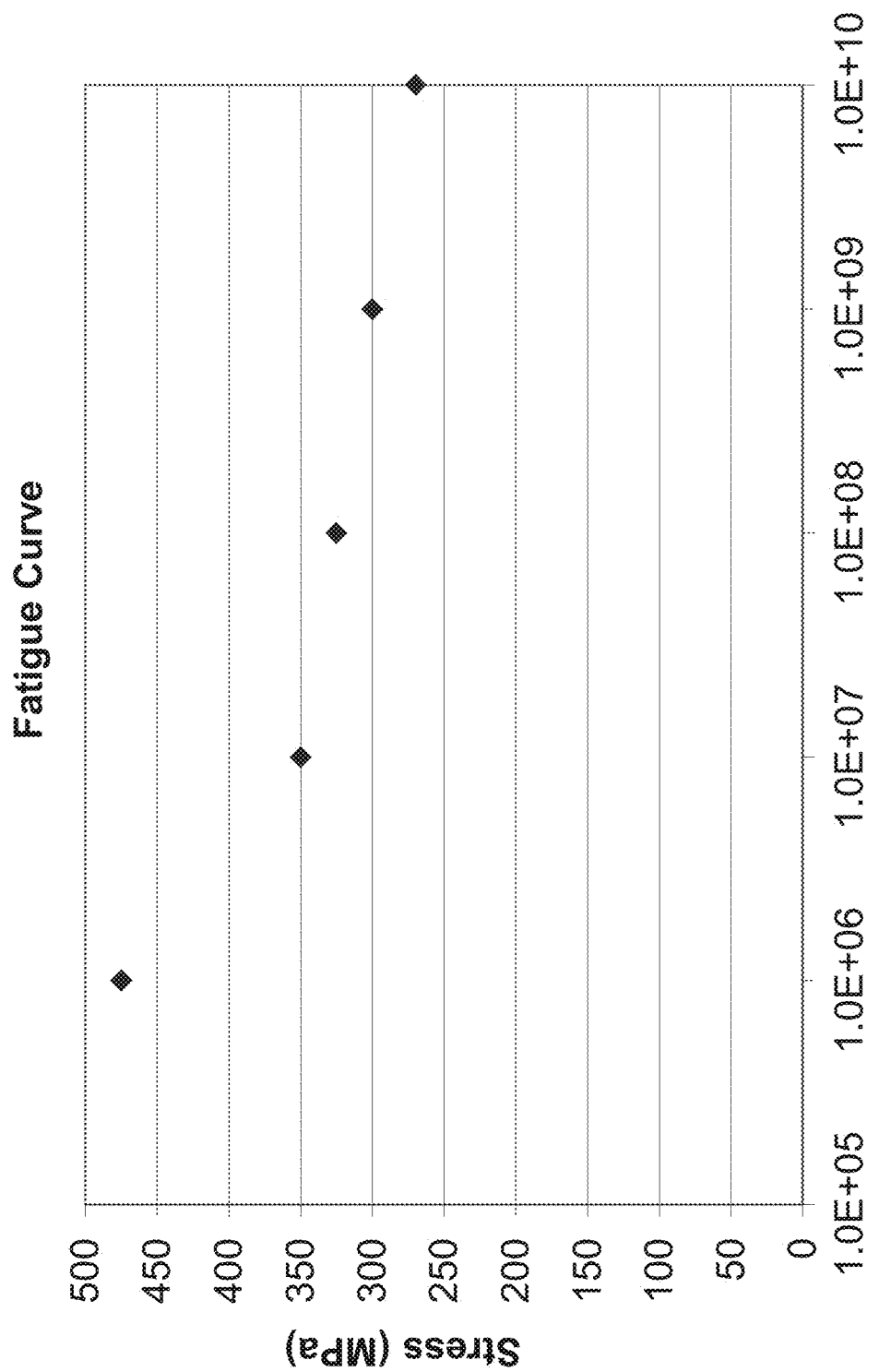

WIRE FOR DEEP WATER TRANSMISSION

CROSS-REFERENCE TO RELATED APPLICATIONS

This application claims priority to U.S. Provisional Patent Application Ser. No. 62/040,272, filed Aug. 21, 2014, the entirety of which are fully incorporated by reference herein.

BACKGROUND

The present disclosure relates to electrically conductive wires. The electrically conductive wires are particularly useful for long power cables, such as those used to provide electricity to deep water devices.

Subsea oil and gas wells may be located in ultra-deep water devices (depths of 1500 meters or greater, ~5000 feet). Providing electricity to subsea devices at this depth requires suspending very long power cables from a surface location at sea to a terminal location on the sea floor. The weight of these power cables is largely borne at the end of the power cable secured to the surface location. The power cables are also affixed to riser tubing/scaffolding coming up from the sea floor to bear the weight of the cable. The need for such scaffolding can complicate the construction of the oil/gas well. In addition, the power cable will experience large tensile forces and dynamic motion during its service lifetime, for example due to movement of waves and/or ocean currents. The cable can also be exposed to torsional forces that twist the cable.

Power cables include metallic conductor wires, typically consisting of copper. These copper conductor wires generally have poor mechanical properties. In particular, the end of the conductor wire is usually not strong enough to support the weight of the remaining wire in such long power cables, resulting in failure due to various stress-related phenomena over time.

It would be desirable to develop new electrically conductive wires that have improved mechanical strength as well as other desirable properties.

BRIEF DESCRIPTION

The present disclosure relates to electrically conductive wires that are suitable for use in long subsea power cables. The wire is made of a first wire portion and a second wire portion. The first wire portion is located at one end of the wire, and is made of a metal that has a higher ultimate tensile strength than the second wire portion. It is contemplated that the first wire portion, i.e. the end of the wire, is located at the end of the power cable that is secured to the surface location, or in other words at the end that supports the weight of the rest of the wire. This can reduce or eliminate the need for scaffolding to support the weight of the power cable. In more specific embodiments, the second wire portion also has a higher electrical conductivity than the first wire portion.

Disclosed in various embodiments herein are electrically conductive wires for deep water transmission, having a first wire portion and a second wire portion welded together; wherein the first wire portion is formed of a first metal, is located at one end of the wire, and has a length of about 100 feet or greater; wherein the second wire portion is formed of a second metal; and wherein the first metal has a higher ultimate tensile strength than the second metal.

The first metal may have an ultimate tensile strength of 100 ksi or higher. The first metal can be a copper-nickel-beryllium alloy. More specifically, the first metal may contain from about 0.2 wt % to about 0.6 wt % of beryllium, about 1.4 wt % to about 2.2 wt % of nickel, and balance copper.

The second metal may have an ultimate tensile strength of 75 ksi or less. The second metal may be at least 99.9 wt % copper.

In some embodiments, the second metal has a higher electrical conductivity than the first metal. In specific embodiments, the second metal has an electrical conductivity of 100% IACS or higher, and the first metal has an electrical conductivity of 80% IACS or lower.

The length of the first wire portion is less than the length of the second wire portion. In particular embodiments, the ratio of the length of the second wire portion to the ratio of the length of the first wire portion is from about 10:1 to about 50:1. More specifically, the length of the first wire portion can be from about 100 feet to about 500 feet, and the length of the electrically conductive wire can be about 2,000 feet or longer.

The electrically conductive wire may have a diameter of from about 1 millimeter to about 3 millimeters.

The electrically conductive wire may further comprise a third wire portion located at the other end of the wire which is formed of the first metal, is welded to the second wire portion, and has a length of about 100 feet or greater.

Also disclosed herein are power cables for deep water transmission comprising at least one core; and externally from the core: a water-proofing layer; an armor layer; and an external polymeric sheath. Each core comprises: an electrically conductive wire having a first wire portion and a second wire portion welded together, wherein the first wire portion is formed of a first metal, is located at one end of the wire, and has a length of about 100 feet or greater, wherein the second wire portion is formed of a second metal, and wherein the first metal has a higher ultimate tensile strength than the second metal; an inner semiconductive layer; an electrically insulating layer; and an outer semiconductive layer.

In specific embodiments, the power cable has one to three cores.

Also disclosed are methods of providing power to a deep water device comprising: connecting a first end of a power cable to an above-water power source; and connecting a second end of the power cable to the deep water device; wherein the power cable comprises an electrically conductive wire having a first wire portion and a second wire portion welded together, wherein the first wire portion is formed of a first metal, is located at one end of the wire, and has a length of about 100 feet or greater, wherein the second wire portion is formed of a second metal, and wherein the first metal has a higher ultimate tensile strength than the second metal; and wherein the first wire portion is located at the first end of the power cable.

The deep sea device may rest on a sea floor and is a well fluid processing device. In some embodiments, the power source is on a platform or a floating production, storage, and offloading (FPSO) unit.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 6 is a graph showing the fatigue curve of a copper alloy suitable for use as the first metal at the end of the wire. This shows the magnitude of a cyclic stress versus the number of cycles to failure. The specific values are provided in (cycles, MPa), and are ($10^6$, 475); ($10^7$, 350); ($10^8$, 325); ($10^9$, 300); and ($10^{10}$, 270).

DETAILED DESCRIPTION

Figure 1:
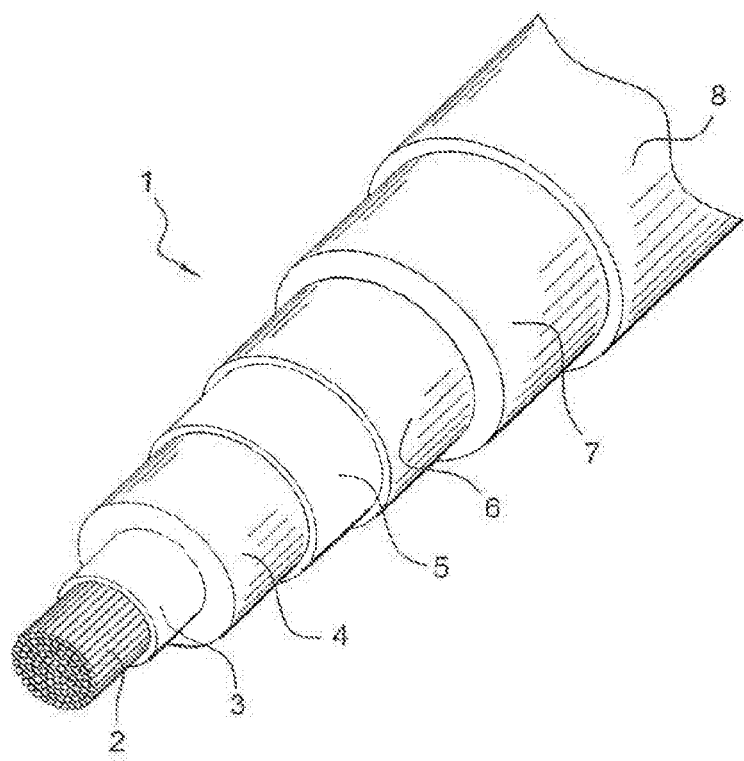
FIG. 1 is an exploded perspective view of a power cable having a single conductor core.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4."

As used in the specification and claims, the term "metal" refers to a relatively pure elemental metal (i.e., a metal containing a single element and impurities) or an alloy of two or more elements.

The present disclosure relates to electrically conductive wires, power cables containing the electrically conductive wires, and methods for providing electricity to deep water devices using the power cables. In this regard, power cables may have one or more conductive cores.

FIG. 1 is a perspective view of a single-core power cable 1 contemplated by the present disclosure, made up of several layers wrapped concentrically about the core. The power cable 1 includes a conductor 2 which is made up of a plurality of electrically conductive wires of the present disclosure. It is noted that the electrically conductive wires can be straight or be helically wound. An inner semiconductive layer 3 surrounds the core 2. Any gaps between the wires can be filled with a water-blocking compound. The next layers of the power cable are an electrically insulating layer 4 and an outer semiconductive layer 5. Next, a water-proofing layer 6 provides an impermeable barrier from the external environment. An armor layer 7 is then present, which is typically made of one or two layers of helically wound wires. Finally, a polymeric sheath 8 encases the other layers. In a single-core cable, the polymeric sheath 8 also forms the outer layer of the cable.

Figure 2:
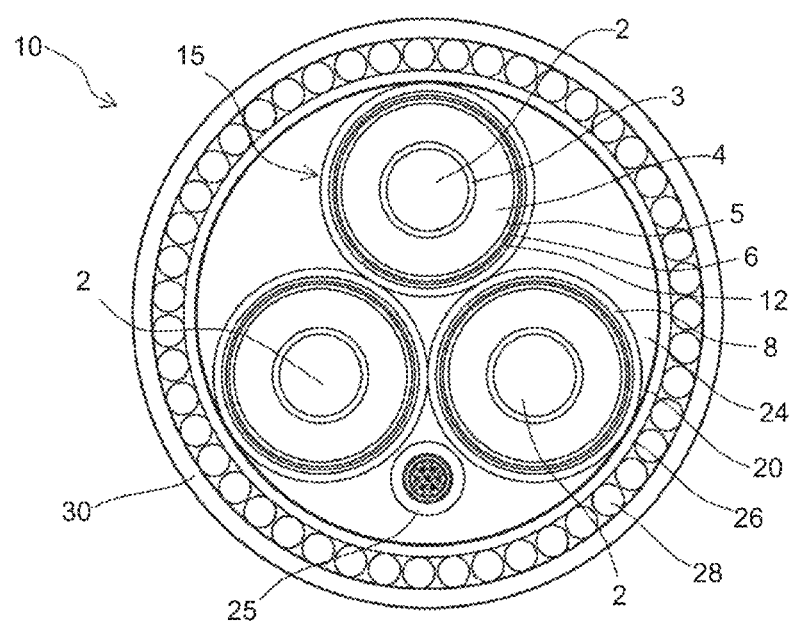
FIG. 2 is a cross-sectional view of a power cable having three conductor cores.

FIG. 2 is a perspective view of a three-core power cable 10 contemplated by the present disclosure. The power cable includes three cores 15. Each core includes a conductor 2 made up of a plurality of electrically conductive wires. Each core is also concentrically surrounded by an inner semiconductive layer 3, an electrically insulating layer 4, an outer semiconductive layer 5, a water-proofing layer 6, a metal screen 12, and a polymeric sheath 8. These three separate cores 15 are then bundled together with binder tape 20 concentrically surrounding the three cores 15. A fiber-optic cable 25 can also be included in the bundle, if desired. Filler 24 can be used to fill any remaining space within the binder tape layer 20. Another water-proofing or sheath layer 26 can be placed around the binder tape 20. An armor layer 28 surrounds the water-proofing layer 26 (only one layer of wires depicted), and an external polymeric sheath 30 encases the other layers and forms the outer layer of the three-core power cable.

The semiconductive layers 3, 5 may be made from the same or different compositions. The semiconductive layers are generally formed from the combination of a polymer and a conductive filler. Non-limiting examples of conductive fillers include carbon black, graphite, carbon nanotubes, doped inorganic carbon fillers (e.g., aluminum-doped zinc oxide), powders of intrinsically-conductive polymers, or a mixture thereof.

The electrically-insulating layer 4 can be any suitable polymer, for example crosslinked polyethylene, ethylene-propylene rubber (EPR), or polyvinyl chloride (PVC). The armor layer 7, 28 is typically formed from two layers of contra-helically wound wire. The polymeric sheath 8, 26, 30 can be formed from any suitable polymer, for example polyethylene. The metal screen 12 can be copper, aluminum, or steel. These aspects are generally known in the art.

Figure 3:
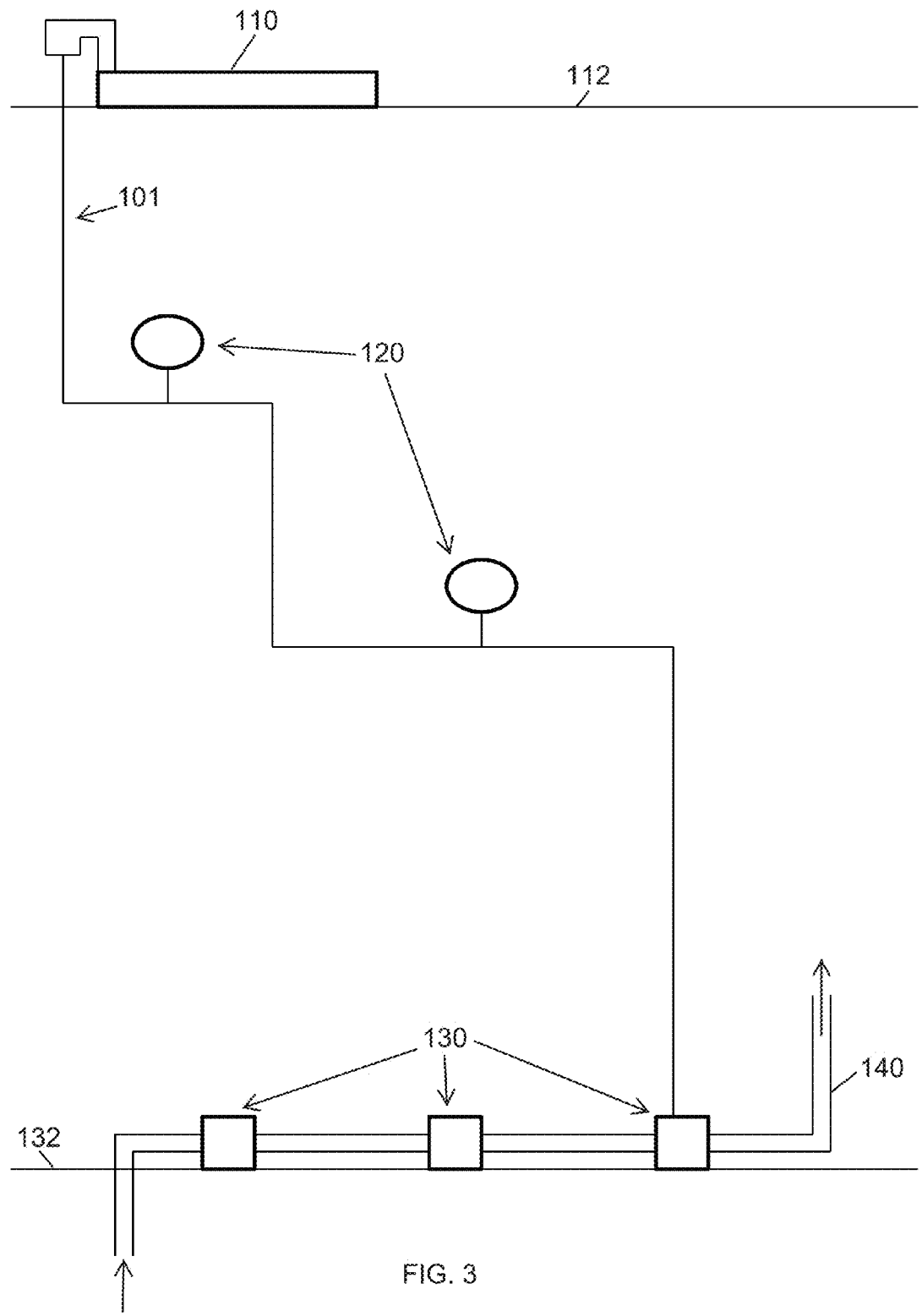
FIG. 3 is a schematic view of a system for providing electricity to an underwater device.

FIG. 3 is a schematic view illustrating the use of a power cable 101 of the present disclosure to provide electricity to a deep sea device 130. One end of the power cable 101 is secured to a power source 110 at the surface 112 of a body of water. The power source 110 may be a platform or a floating production, storage, and offloading (FPSO) unit. The other end of the power cable 101 is connected to a deep sea device 130 resting on the sea floor 132. The power cable 101 is optionally supported by one or more buoys 120. In the depicted embodiment, the deep sea device 130 is a piece of well fluid processing and/or reinjection equipment. The equipment 130 is located in a pathway 140 for extracting hydrocarbons (e.g., oil and/or gas) from a well beneath the sea floor 132. The equipment 130 may be used to make improvements to production fluids emanating from the well. For example, the equipment may safely separate unwanted solids, waters, or hydrocarbon phases prior to sending the desired products to the surface. Such improvements may save costs and reduce risks of harm to people and the environment. The power cable is preferably not supported by any scaffolding, and can be described as being freely suspended.

Figure 4:
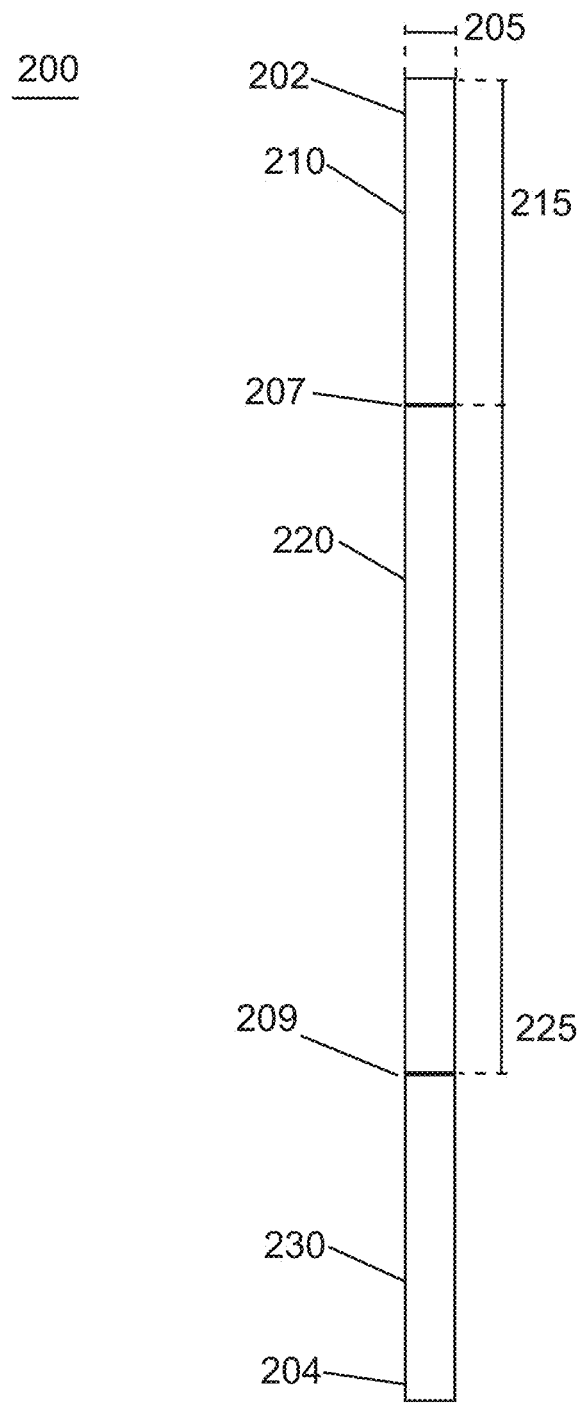
FIG. 4 is a cross-sectional schematic of an electrically conductive wire of the present disclosure.

FIG. 4 is a schematic diagram of an electrically conductive wire 200 according to the present disclosure, and is not drawn to scale. The wire includes a first wire portion 210, a second wire portion 220, and optionally a third wire portion 230. The first wire portion is located at one end 202 of the wire, and the third wire portion is located at the other end 204 of the wire, and they are generally identical when the third wire portion is present. Put another way, the second wire portion 220 is located between the first wire portion 210 and the third wire portion 230. The first wire portion 210 and the second wire portion 220 are metallurgically connected at a joint 207 (e.g., a welded joint), and the third wire portion 230 and the second wire portion 220 are metallurgically connected at another joint 209. The electrically conductive wire has a diameter 205 of from about 1 millimeter to about 3 millimeters.

Again, one prior problem is that most of the weight of the electrically conductive wire is borne by the end of the wire (and cable) that is secured to the power source at the surface. In the present disclosure, the first wire portion 210 and/or third wire portion are intended to correspond to the end of the wire that bears the weight of the wire, which mostly consists of the second wire portion 220. This is done by using a first metal for the first wire portion and/or the third wire portion, and by using a second metal for the second wire portion. The first metal has a higher ultimate tensile strength than the second metal. It is contemplated that the first metal and second metal both contain copper.

The first wire portion 210 has a minimum length 215 of about 100 feet or greater. Keeping in mind that the length of the wire (and the power cable) are intended to reach to depths of 5000 feet or greater, the length of the first wire portion can also be greater if desired. The length of the first wire portion can be about 500 feet, or about 1000 feet, or about 2000 feet, or from about one hundred (100) feet to about two thousand (2,000) feet. The length 215 of the first wire portion is less than the length 225 of the second wire portion. More specifically, the second wire portion is at least 50% of the length of the overall wire, and is usually much higher. In particular embodiments, the ratio of the length of the second wire portion to the ratio of the length of the first wire portion can be from about 5:1 to about 50:1, or from about 10:1 to about 20:1. In particular embodiments, the length of the first wire portion is from about 100 feet to about 500 feet, and the length of the electrically conductive wire is about 2,000 feet or longer.

A first metal is used to form the first wire portion and/or the third wire portion. In particular embodiments, the first metal is a copper-nickel-beryllium alloy. The copper-nickel-beryllium alloy may contain from about 0.1 weight percent (wt %) to about 1 wt % beryllium. In some embodiments, the beryllium content is from about 0.2 to about 0.6 weight percent. The copper-nickel-beryllium alloy may contain from about 1 wt % to about 3 wt % nickel. In some embodiments, the nickel content is from about 1.4 wt % to about 2.2 wt % nickel. In specific embodiments, the first metal contains from about 0.2 wt % to about 0.6 wt % of beryllium, about 1.4 wt % to about 2.2 wt % of nickel, and balance copper.

The copper-nickel-beryllium alloy may be Alloy 3 UNS Number C17510 (commercially available from Materion Corporation). C17510 contains from about 0.2 wt % to about 0.6 wt % beryllium, from about 1.4 wt % to about 2.2 wt % nickel, and a balance of copper. The Table below lists selected physical properties of C17510.

| Selected Properties of C17510 | |
|---|---|
| Elastic Modulus | 20 × 10$^6$ psi (138 GPa) |
| Density | 0.319 lb/in$^3$ (8.83 g/cm$^3$) |
| Poisson's Ratio | 0.3 |
| Relative Magnetic Permeability | <1.01 |
| Electrical Conductivity | 45-60% IACS (26.2-34.9 MS/m) |
| Thermal Conductivity at 70° F./20° C. | 140 BTU/ft-hr-° F. (240 W/m-K) |
| Coefficient of Thermal Expansion | 9.8 ppm/° F. (17.6 ppm/° C.) |
| Specific Heat (Heat Capacity) at 70° F./20° C. | 0.08 BTU/lb-° F. (335 J/kg K) |
| Specific Heat (Heat Capacity) at 200° F./100° C. | 0.091 BTU/lb-° F. (381 J/kg K) |
| Melting Range | 1,900-1,980° F. (1,040-1,080° C.) |

The first metal has an ultimate tensile strength of 100 ksi or higher. The copper-nickel-beryllium alloy may be age hardened to obtain such properties. Age hardening is a heat treatment of the alloy, and is a controlled process of heating and cooling metals to alter the physical and mechanical properties without changing the product shape. Heat treatment is associated with increasing the strength of the material but it can also be used to alter certain manufacturability objectives such as to improve machining, improve formability, or to restore ductility after a cold working operation. The alloy is placed in a traditional furnace or other similar assembly and then exposed to an elevated temperature in the range of about 900° F. to about 950° F. for a time period of from about 2 hours to about 3 hours. It is noted that these temperatures refer to the temperature of the atmosphere to which the alloy is exposed, or to which the furnace is set; the alloy itself does not necessarily reach these temperatures.

After age hardening, the copper-nickel-beryllium alloy may have a 0.2% offset yield strength of about 80 ksi to about 125 ksi, and may have an ultimate tensile strength of about 100 ksi to about 140 ksi.

The second metal is used to form the second wire portion. The second metal may be relatively pure copper, and in particular embodiments contains a minimum of 99.9 wt % copper. The second metal may be oxygen-free copper or electrolytic tough pitch copper. Generally, oxygen-free copper has better drawing and resistance to hydrogen embrittlement compared to electrolytic tough pitch copper, because it contains less dissolved oxygen. The remainder of the second metal may be, for example, silver, nickel, and/or tin, or other impurities.

In some embodiments, the second metal is C102 copper alloy. The C102 may have the properties listed in the Table below.

| Selected Properties of C102 | |
|---|---|
| Electrical Conductivity | 101% IACS @ 68° F. |
| Electrical Resistivity | 1.71 microΩ-cm @ 68° F. |
| Melting Point | 1981° F. |
| Density | 0.323 lbs/in$^3$ (8.92 g/cm$^3$) |
| Coefficient of Thermal Expansion | 9.8 ppm/° F. |

C102 copper alloy has a 0.2% offset yield strength of about 45 ksi to about 60 ksi, and has an ultimate tensile strength of about 25 ksi to about 75 ksi. In embodiments, the second metal has an ultimate tensile strength of 75 ksi or less.

In some embodiments, the second metal is C110 copper alloy. The C110 may have the properties listed in the Table below.

| Selected Properties of C110 | |
|---|---|
| Density | 0.322 lb/in$^3$ @ 68° F. (8.92 g/cm$^3$) |
| Thermal Conductivity | 390 W/m-K |
| Electrical Resistivity | 1.71 microΩ-cm |
| Electrical Conductivity (annealed) | 101% IACS (0.586 megamho/cm) |
| Modulus of Elasticity | 17,000,000 psi (117 kN/mm$^2$) |
| Coefficient of Thermal Expansion | 9.8 ppm/° F. (17.64 ppm/° C.) |

C110 copper alloy has a 0.2% offset yield strength of about 45 ksi to about 60 ksi, and has an ultimate tensile strength of about 25 ksi to about 75 ksi.

In particular embodiments, the electrical conductivity of the second wire portion is higher than the electrical conductivity of the first wire portion. More specifically, the second metal may have an electrical conductivity of 100% IACS or higher, and the first metal may have an electrical conductivity of 80% IACS or lower. The IACS refers to the International Annealed Copper Standard. 100% IACS is a conductivity of 58,001,000 Siemens/meter (S/m) at 20° C.

The first wire portion, the second wire portion, and the third wire portion may be metallurgically connected via welding. After the different wire portions/segments are welded together, they can be rolled and drawn to size as though they are one wire.

Figure 5:
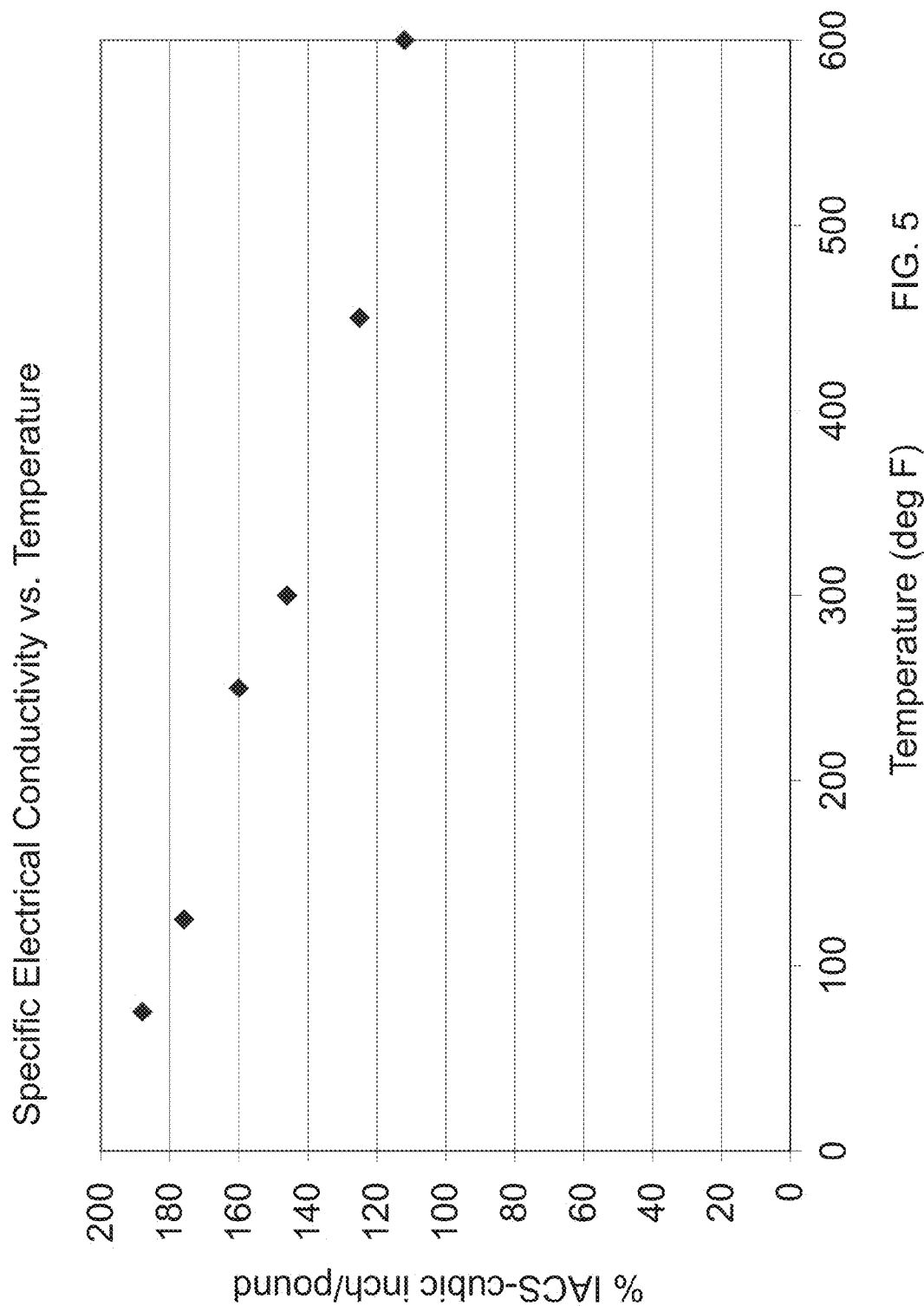
FIG. 5 is a graph showing the electrical conductivity of a copper alloy suitable for use as the first metal at the end of the wire. The conductivity is shown as a function of temperature (° F.). The specific values are provided in (deg° F., specific conductivity), and are (75, 188); (125, 176); (250, 160); (300, 146); (450, 125); and (600, 112).

FIG. 5 is a graph showing the specific electrical conductivity of age-hardened C17510 (the first metal used in the first wire portion). The y-axis is in units of % IACS-in$^3$/lb, and the x-axis is in degrees Fahrenheit. As seen here, the specific electrical conductivity increases as the temperature decreases. It is noted that the temperature of the first wire portion will be higher than the temperature of the water in which the cable is immersed, due to functional resistance heating. Please note that these values need to be multiplied by the density to obtain the electrical conductivity.

FIG. 6 is a fatigue curve at room temperature for the age-hardened C17510 (the first metal used in the first wire portion). This graph can be interpreted as providing the number of cycles to failure for a given applied stress.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. An electrically conductive wire for deep water transmission having a first wire portion and a second wire portion welded together;
    wherein the first wire portion is formed of a first metal, is located at one end of the wire, and has a length of about 100 feet or greater;
    wherein the second wire portion is formed of a second metal; and
    wherein the first metal has a higher ultimate tensile strength than the second metal; and
    wherein the length of the first wire portion is less than the length of the second wire portion.

2. The electrically conductive wire of claim 1, wherein the first metal has an ultimate tensile strength of 100 ksi or higher.

3. The electrically conductive wire of claim 1, wherein the first metal is a copper-nickel-beryllium alloy.

4. The electrically conductive wire of claim 3, wherein the first metal contains from about 0.2 wt % to about 0.6 wt % of beryllium, about 1.4 wt % to about 2.2 wt % of nickel, and balance copper.

5. The electrically conductive wire of claim 1, wherein the second metal has an ultimate tensile strength of 75 ksi or less.

6. The electrically conductive wire of claim 1, wherein the second metal is at least 99.9 wt % copper.

7. The electrically conductive wire of claim 1, wherein the second metal has a higher electrical conductivity than the first metal.

8. The electrically conductive wire of claim 1, wherein the second metal has an electrical conductivity of 100% IACS or higher, and the first metal has an electrical conductivity of 80% IACS or lower.

9. The electrically conductive wire of claim 1, wherein the ratio of the length of the second wire portion to the ratio of the length of the first wire portion is from about 10:1 to about 50:1.

10. The electrically conductive wire of claim 1, wherein the length of the first wire portion is from about 100 feet to about 500 feet, and the length of the electrically conductive wire is about 2,000 feet or longer.

11. The electrically conductive wire of claim 1, having a diameter of from about 1 millimeter to about 3 millimeters.

12. The electrically conductive wire of claim 1, further comprising a third wire portion located at the other end of the wire which is formed of the first metal, is welded to the second wire portion, and has a length of about 100 feet or greater.

13. A power cable for deep water transmission comprising:
    at least one core, each core comprising:
        an electrically conductive wire having a first wire portion and a second wire portion welded together, wherein the first wire portion is formed of a first metal, is located at one end of the wire, and has a length of about 100 feet or greater, wherein the second wire portion is formed of a second metal, and wherein the first metal has a higher ultimate tensile strength than the second metal, and wherein the length of the first wire portion is less than the length of the second wire portion;
        an inner semiconductive layer;
        an electrically insulating layer; and
        an outer semiconductive layer; and externally from the core:
a water-proofing layer;
an armor layer; and
an external polymeric sheath.

14. The power cable of claim 13, wherein the power cable has three cores.

15. The power cable of claim 13, wherein the first metal has an ultimate tensile strength of 100 ksi or higher, and wherein the second metal has an ultimate tensile strength of 65 ksi or lower.

16. The power cable of claim 13, wherein the first metal is a copper-nickel-beryllium alloy containing from about 0.2 wt % to about 0.6 wt % of beryllium, about 1.4 wt % to about 2.2 wt % of nickel, and balance copper.

17. The power cable of claim 13, wherein the second metal is at least 99.9 wt % copper.

18. The power cable of claim 13, wherein the second metal has an electrical conductivity of 100% IACS or higher, and the first metal has an electrical conductivity of 80% IACS or lower.

19. A method of providing power to a deep water device comprising:

connecting a first end of a power cable to an above-water power source; and connecting a second end of the power cable to the deep water device;

wherein the power cable has a conductor that comprises an electrically conductive wire having a first wire portion and a second wire portion welded together, wherein the first wire portion is formed of a first metal, is located at one end of the wire, and has a length of about 100 feet or greater, wherein the second wire portion is formed of a second metal, and wherein the first metal has a higher ultimate tensile strength than the second metal; and wherein the first wire portion is located at the first end of the power cable.

* * * * *